Patented Feb. 26, 1929.

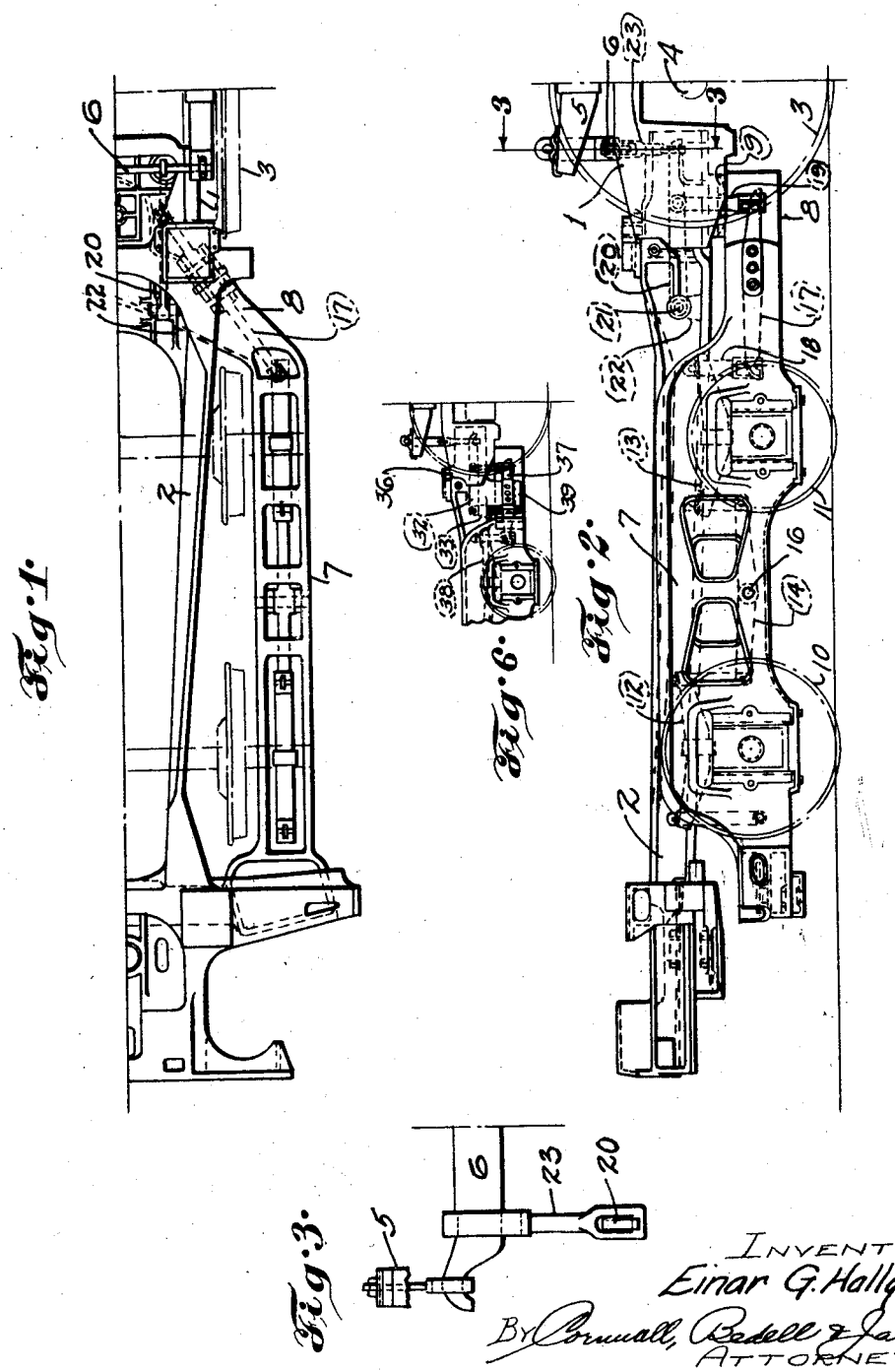

1,703,526

UNITED STATES PATENT OFFICE.

EINAR G. HALLQUIST, OF EDWARDSVILLE, ILLINOIS, ASSIGNOR TO COMMONWEALTH STEEL COMPANY, OF GRANITE CITY, ILLINOIS, A CORPORATION OF NEW JERSEY.

LOCOMOTIVE-SPRING-EQUALIZING ARRANGEMENT.

Application filed October 18, 1927. Serial No. 226,890.

My invention relates to railway rolling stock and consists in a novel equalizing connection between two sets of frame supporting springs such as is adapted to be used between the driver springs of a locomotive and the springs of a supplemental truck. I wish it to be understood, however, that my invention is not limited to this particular application but may be used wherever two sets of supporting springs are to be equalized.

In my copending application Serial Number 225,895 filed October 13, 1927, I describe and claim an arrangement for the same purpose and the disadvantages of previous constructions set forth in that application, and the overcoming of these disadvantages is the main object of my present invention.

Briefly the objects of my invention are to eliminate interference between equalizers connecting outside and inside springs, to increase the stability of structures supported by such equalizers and to use interconnecting elements of less weight than those which have been required previously.

In the accompanying drawings which illustrate my invention—

Figure 1 is a top view of one longitudinal half of the rear end of a locomotive main frame together with the trailing truck supporting the same.

Figure 2 is a side elevation of the structure shown in Figure 1.

Figure 3 is a transverse view showing some of the interconnecting elements.

Figure 6 is a detail side elevation illustrating another modification of my invention.

Figure 4:
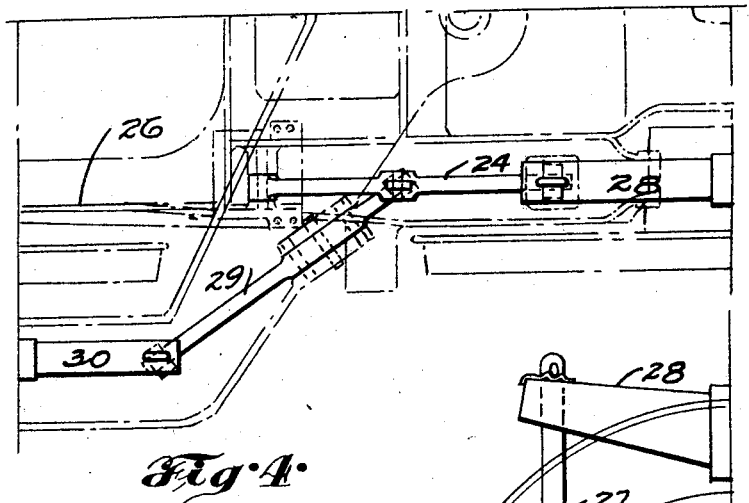
Figures 4 and 5 are, respectively, top and side detail views, largely diagrammatic, illustrating a modification of my invention.

The locomotive main frame 1 illustrated in Figures 1 and 2 is of any ordinary type and is provided with a rear extension or cradle 2, either formed integrally with the frame or formed separately therefrom and attached thereto. This cradle supports the firebox, ash pan, and cab (not shown) in the usual manner. The frame is mounted upon a series of drivers, the rear one of which is indicated at 3 and the driving axle 4 carries a box upon which the spring 5 is mounted in the usual manner. The front end of this spring is connected to the other driver springs and the rear end carries a cross bar 6 which is connected to the rear end of the corresponding spring on the other side of the locomotive.

One wheel piece of the trailer truck is indicated at 7 and the forward end of this wheel piece terminates in a converging or transverse member 8, the forward end of which is articulated with the main frame at 9. The truck wheels 10 and 11 support the truck frame through springs 12 and 13, respectively, and an equalizer 14 pivoted to the truck frame at 16. The forward end of spring 13 supports one end of an equalizer 17 by means of a link 18 and the other end of this equalizer 17 is carried by a link 19 which is pivotally suspended from a lever 20 fulcrumed at 21 on a bracket 22 formed on the main frame extension 2, the other end of lever 20 being suspended by a link 23 from cross bar 6 extending between the driver springs 5. The intermediate portion of equalizer 17 is fulcrumed to the truck frame member 8 and supports the latter from the truck spring and driver spring.

With this arrangement, the forward or inner end of the equalizer may be carried at points to the rear of the end of driver spring 5 and thus any desired clearance may be provided between the equalizer and brake heads or other rigging applied to the driver 3. By shifting the location of bracket 22 or the point of suspension of link 19 any desired distribution of the equalizer weight may be obtained and obviously the general arrangement is susceptible of many modifications.

Figure 5:
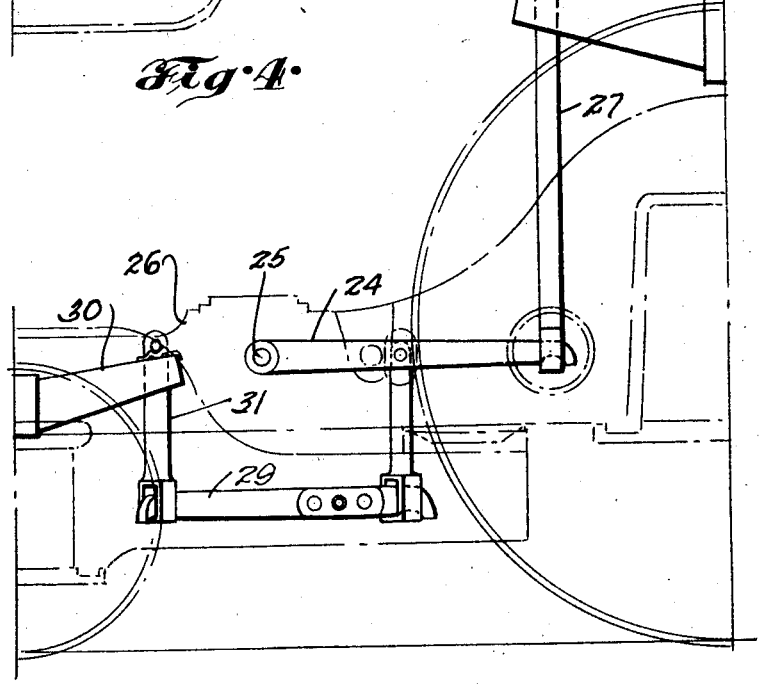

One such modification is illustrated in Figures 4 and 5 in which the lever 24 pivoted at 25 on the main frame extension 26 has its forward end suspended by a link 27 directly from the rear end of driver spring 28, thus eliminating the cross bar 6 shown in Figures 1 and 2. Obviously such an arrangement, where practical, will shorten the equalizer 29, one end of which is carried by lever 24, and will increase the stability of the same as its forward end will be supported farther from the center line of the frame than in the arrangement shown in Figure 1. The other end of equalizer 29 is carried from the truck spring 30 by a hanger 31 similar to the suspension of lever 17 as shown in Figures 1 and 2.

Another modification is illustrated in Figure 6 in which the lever 32 is fulcrumed on the bracket 33 formed on the main frame 36 and supports one end of an equalizer 37, the other end of which equalizer is carried by the truck spring 38. The equalizer, however, does not support the front end of the truck frame but is fulcrumed on a depending bracket 39 formed on the main frame.

In each of the forms shown, the lever which supports the inner end of the equalizer is fulcrumed upon the main frame extension. In my above-mentioned copending application the structure there described utilizes a somewhat similar equalizer supporting lever but the same is fulcrumed upon the truck frame.

Obviously various other arrangements of the parts may be shown without departing from the spirit of my invention, and I contemplate the exclusive use of all such modifications in the structure as come within the scope of my claims.

I claim:

1. In a locomotive, a main frame, a truck frame, a main frame supporting spring, a truck frame supporting spring, an equalizer partly carried by and extending diagonally inwardly from said truck spring, and a lever pivoted on said main frame in the rear of said main frame spring and supported at its other end by said main frame spring and carrying the inner portion of said equalizer.

2. In a locomotive, a main frame, a spring supporting said frame, a bracket on said frame beyond the end of said spring, a lever fulcrumed on said bracket and supported by said spring, a truck frame, a spring supporting the same, and an equalizer supported by said truck spring and by said lever and fulcrumed on said truck frame to support the latter.

3. In a locomotive, driving wheels, a main frame and supporting springs therefor located inwardly of said wheels, truck wheels, a truck frame and supporting springs therefor located outwardly of said truck wheels, a member supported by one of said main frame springs and by a main frame element at the rear thereof, and an equalizer supporting said truck frame between the ends of the equalizer, said equalizer having one end supported by one of said truck springs and its other end supported by said member.

4. In a locomotive, a main frame, supporting springs therefor, a transverse member carried by said springs, a lever supported by said member and by said frame, a truck frame, a supporting spring therefor, and a truck frame supporting equalizer carried by said truck spring and by said lever.

5. In a locomotive, a main frame, a truck frame, respective springs for supporting said frames, and a compound connection between said springs comprising a lever carried by one spring and by the frame supported by said spring, and an equalizer carried by the other spring and by said lever and supporting the other frame.

6. In a locomotive, a main frame, a truck frame, respective springs for supporting said frames, and a compound connection between said springs comprising a lever carried by one spring and by the frame supported by said spring, and an equalizer carried by the other spring and by said lever and supporting one of said frames.

7. In a locomotive, a main frame, a spring supporting said frame, a fulcrum member on said frame, a lever pivoted on said member and supported by said spring, a truck spring, and an equalizer bar carried by said lever and by said truck spring.

8. In a locomotive, a main frame, driver wheels, journal boxes and springs located between said wheels, truck wheels, journal boxes and springs located outwardly of said truck wheels, a lever pivoted on said main frame and carried thereby and by one of said driver springs, and an equalizer bar carried by said lever and by the other of said springs.

In testimony whereof I hereunto affix my signature this 5th day of Oct., 1927.

EINAR G. HALLQUIST.